Patented May 26, 1936

2,042,173

UNITED STATES PATENT OFFICE 2,042,173

COLORING MATERIAL FOR FOOD FATS AND OILS

Adino F. Files, Maumee, Ohio

No Drawing. Application April 8, 1935, Serial No. 15,258

5 Claims. (Cl. 99—148)

My invention has for its object to provide a finely divided, dry coloring for butter, oleomargarine, and other oleaginous foods, both liquid and solid. It particularly has for its object to provide a coloring material that may be easily handled commercially and conveniently applied by distribution of sub-divided portions for coloring oleaginous foods.

By my invention the coloring material may be readily distributed throughout oleaginous foods and then easily worked into the foods. In connection with hard fat, such as butter, oleomargarine, and shortening fats, it is particularly advantageous since the material may be readily sprinkled over them and then worked into the fat, and by reason of its minute sub-division, more intense shades of color are avoided in localized parts of the fat.

The material embodying my invention is not only pulverulent in form, but it is also relatively non-aggregative to enable ready sprinkling or sub-division and distribution of the coloring material. The material is formed of two parts, one the coloring material and the other the carrier for the coloring material. The coloring material is of a character that will be readily taken up by the oleaginous foods to produce the desired color, and the carrier is of a character similar to commonly used oleaginous foods and thus will readily mix with the oleaginous foods, and of itself constitutes a desirable food. It is particularly of a character that will be readily absorbed by oleomargarine and butter. Consequently, the coloring material may be conveniently introduced in desired quantity into churns used in the production of butter and milk-mixing churns commonly used in the manufacture of oleomargarine with the result that the color, together with the carrier which is formed of the solid parts of milk, will be readily taken up by the butter fat in butter formation and by the oils and fats of oleomargarine in the manufacture of oleomargarine.

Vegetable or aniline colors may be used. When aniline colors are used, it is preferable to use benzeneazo-b-naphthylamine and ortho-tolueneazo-b-naphthylamine, also known and indicated in the art as yellow A. B. and O. B. respectively. The dyes are mixed in proportion of 1 of A. B. to 9 of O. B. to accomplish the best results. It is understood, however, that these proportions may be varied to vary the tints as may be desired. Where vegetable dyes or colors are used in place of the yellow A. B. or O. B., carrotin and the extracts of annato, and turmeric, or mixtures of the said extracts may be used in proportionate amounts with reference to the amount of the carrier similar to that of the A. B. and O. B. aniline dyes. Preferably, the carrotin dry color is triturated with a small amount of turmeric dry color to slightly modify the yellow of the carrotin. The carrier consists of highly desiccated milk, preferably whole milk, from which substantially all of the water is removed.

The desiccated milk has all of the ingredients found in oleomargarine and butter, and the characteristics of the major part of its composition is closely allied to ingredients of practically all of the oleaginous foods. The desiccated milk is of such a character that it will readily mix with the food fats. The dye, being thoroughly absorbed in the desiccated milk, will readily disseminate with the solids of the desiccated milk into fats to be colored. The dye thus enters into solution with the fat, and thus the fat is completely colored by the dye as distinct from being attached to particles of the fat.

To ten grains of the dye mixture I preferably add 240 grains of the desiccated milk. These ingredients are thoroughly mixed by trituration in order that the dyes may be thoroughly incorporated in the mixture and blended and absorbed into the particles of the desiccated milk. Also, the quantity of the dye or color relative to the desiccated milk may be greatly varied as from 1 of dye to 50 parts of the desiccated milk or 1 of dye to 10 parts of the desiccated milk according to the intensity of the color desired. Also, the amount of the coloring material used per quantity of oleaginous foods to be colored may be varied to obtain the desired shade of coloring. I have found that proportions of about 1 of dye to 24 of desiccated milk where 5 grains of mixture is used per pound of food produces the best results in coloring oleomargarine. In coloring butter, the preferred ratio is about 1 of dye to 35 of the desiccated milk.

The desiccated milk readily absorbs the coloring material, and the fats readily absorb the desiccated milk, and thus the coloring material is readily absorbed by and disseminated in the oleaginous foods. Desiccated milk is a material commonly used and recognized as a food similar in character to oleaginous foods. Its constituents are also found in, and constitute a part of, oleomargarine or butter. It thus makes an acceptable addition to oleaginous foods as well as an efficient carrier for the aniline or vegetable colors.

I claim:

1. A dry coloring material for oleaginous foods consisting substantially entirely of a mixture of pulverized desiccated milk and a dye.

2. A dry coloring material for oleaginous foods consisting substantially entirely of pulverized desiccated milk and dye triturated together.

3. A dry coloring material for oleaginous foods consisting substantially entirely of a mixture of pulverized desiccated whole milk and a dye.

4. A dry coloring material for oleaginous foods consisting substantially entirely of a mixture of triturated pulverized desiccated milk and a dye, and substantially free of all fats and oil except that of the desiccated milk.

5. A dry coloring material for oleaginous foods consisting of a minor proportion of aniline dye and a major quantity of desiccated milk, and substantially free from oil and water and triturated together.

ADINO F. FILES.